United States Patent [19]

Mitchell, Jr.

[11] Patent Number: 4,863,203
[45] Date of Patent: Sep. 5, 1989

[54] SEAL ATTACHMENT FOR TUBING

[76] Inventor: Earl F. Mitchell, Jr., 2420 Hyperion Ave., Los Angeles, Calif. 90027

[21] Appl. No.: 31,601

[22] Filed: Mar. 30, 1987

[51] Int. Cl.⁴ ............................................. F16L 21/06
[52] U.S. Cl. .................................... 285/373; 285/369; 285/305
[58] Field of Search ............... 285/373, 372, 418, 419, 285/369, 417, 305

[56] References Cited

U.S. PATENT DOCUMENTS

| | | | |
|---|---|---|---|
| 216,639 | 6/1879 | Allaire | 285/373 X |
| 249,766 | 11/1881 | Hunt | 285/373 |
| 413,133 | 10/1889 | Denison | 285/419 X |
| 518,805 | 4/1894 | Cooper | 285/374 |
| 549,594 | 11/1895 | Cooper et al. | 285/373 X |
| 1,160,284 | 11/1915 | Headly | 285/373 |
| 1,649,752 | 11/1927 | Stone | 24/20 TT |
| 1,726,176 | 8/1929 | Burke | 285/419 X |
| 1,857,297 | 5/1932 | Faulkner | 285/369 |
| 2,038,766 | 4/1936 | Simmons | 285/373 X |
| 2,120,184 | 6/1938 | Mojonnier | 285/373 X |
| 2,760,792 | 8/1956 | Fons | 285/373 |
| 2,980,143 | 4/1961 | Harris | 285/373 |
| 3,061,339 | 10/1962 | Jewell | 285/369 |
| 3,916,489 | 11/1975 | Berger | 285/373 |
| 4,111,234 | 9/1978 | Wells et al. | 138/99 |
| 4,229,028 | 10/1980 | Gray | 285/369 X |
| 4,363,505 | 12/1982 | Smith | 285/369 |
| 4,729,582 | 3/1988 | Zeidler | 285/305 |

FOREIGN PATENT DOCUMENTS 1525999 11/1969 Fed. Rep. of Germany ...... 285/373

Primary Examiner—Randolph A. Reese
Attorney, Agent, or Firm—Beehler, Pavitt, Siegemund, Jagger, Martella & Dawes

[57] ABSTRACT

A mechanical seal for closing the gap between adjacent ends of rigid tubes which must remain in fixed position makes use of two complementary semicylindrical shells, each of which carries a molded sealing gasket provided with a recess adapted to fit around the tubes and around the space between them. A clamp attached to one shell has opposite ends which reach around corresponding protuberances on the other shell. The clamp operates to draw the shells and the molded sealing gaskets into sealing engagement with the rigid tube ends and with each other, thereby to close the gap with a dependable, replaceable seal.

1 Claim, 3 Drawing Sheets

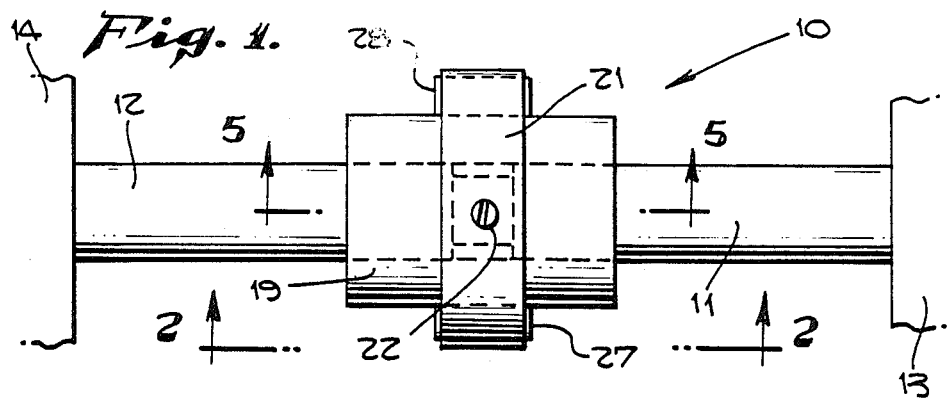
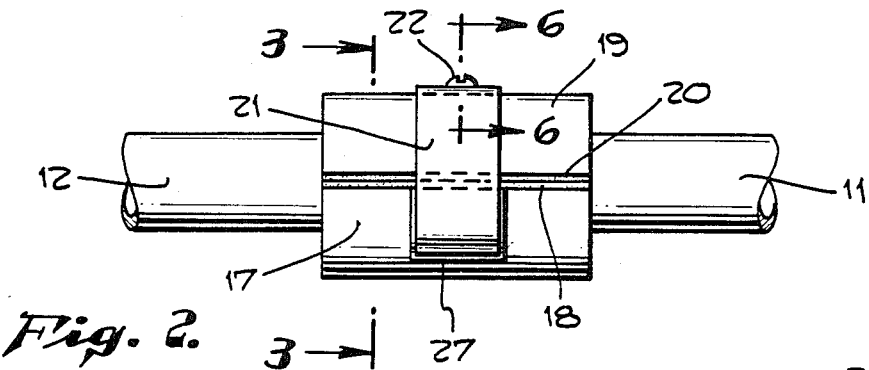
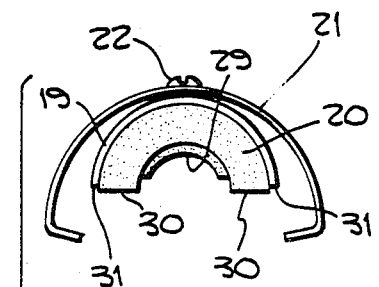
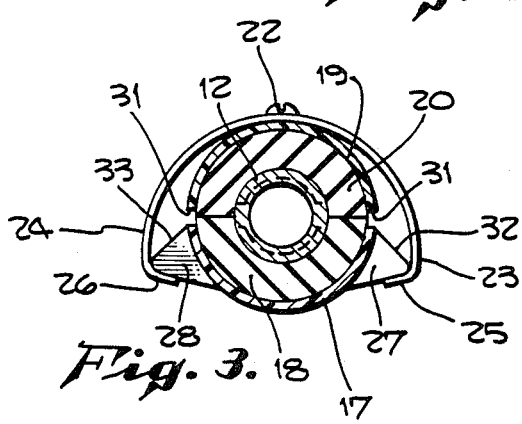
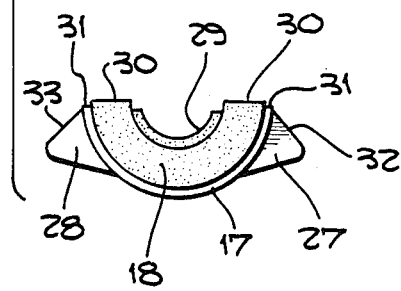

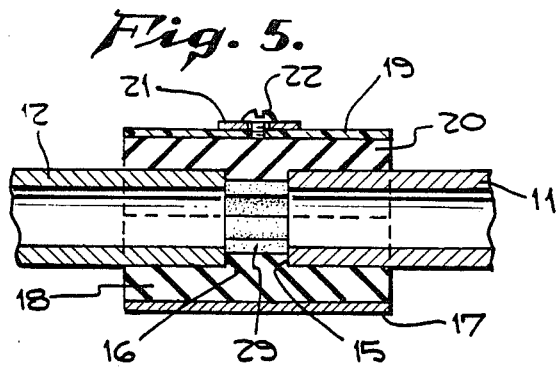
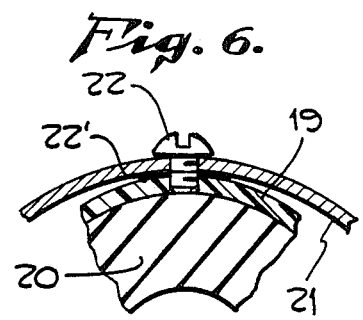
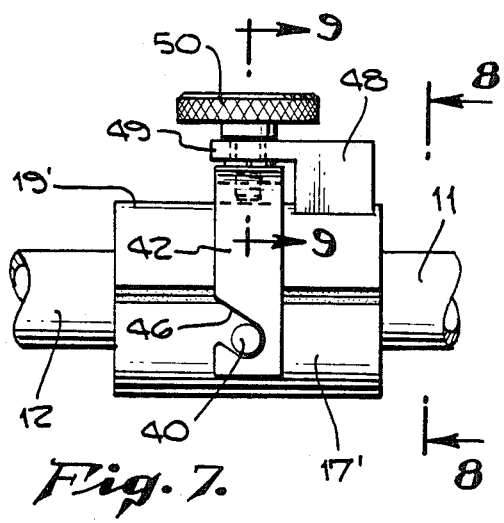
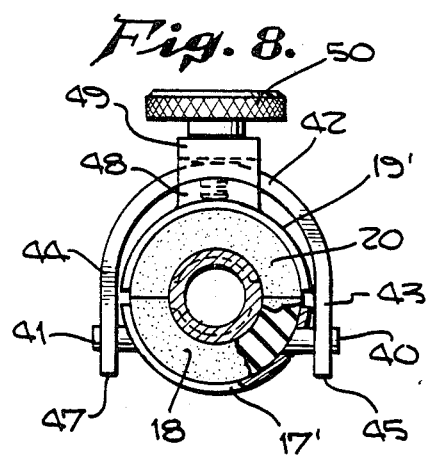
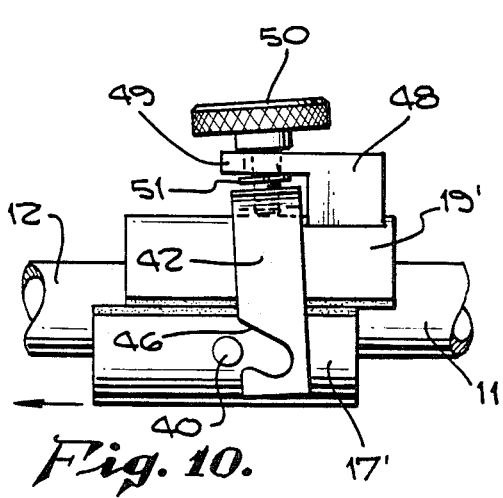
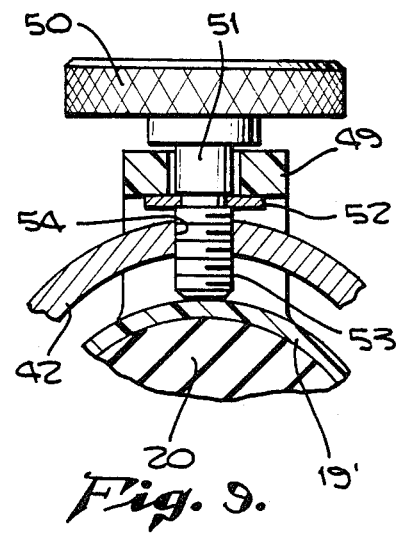

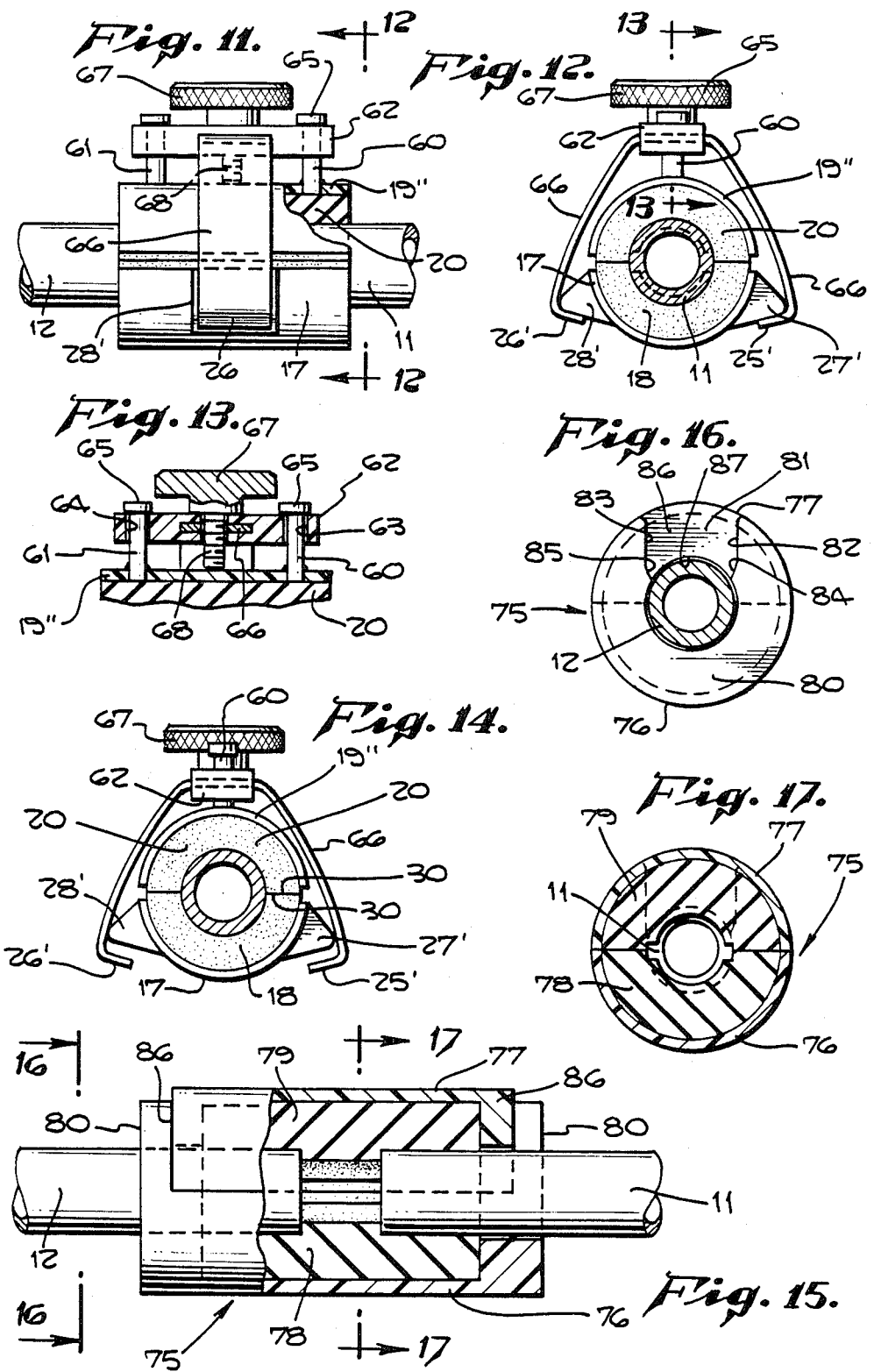

SEAL ATTACHMENT FOR TUBING

The invention herein disclosed is, in the experience of the average individual, most frequently employed as a connecting seal for an automobile engine where adjacent tube ends, usually fixed in position, need to be attached to each other with an effective sealing connection. The problem is a relatively common one wherever combustion engines are involved, but is by no means limited to that field of activity.

The circumstance which gives rise to the problem is usually one where the parts which carry the tubing are fixed in position, the tube ends are relatively rigid tubing, likewise fixed in position not very far apart, and there is limited space for the mechanic to work when applying a connection between the two fixed ends of tubing which will be a dependable and lasting seal. Other circumstances also contribute to the problem as, for example, performing the servicing in a relatively short time and, on occasions where no more than a limited variety of hand-operated tools are readily available. In some instances no hand-operated tools may be available.

The fact that the solving of this problem heretofore has encouraged the development of a great number and variety of types of sealing connections lends support for the contention that the problem has not yet been effectively solved by types of connections heretofore made available to the public.

It is therefore among the objects of the invention to provide a new and improved seal attachment for relatively stiff tubing which has substantially a minimum number of individual parts, easy to handle by an average workman unassisted and by use of simple standard and manipulated tools, or without such tools.

Another object of the invention is to provide a new and improved seal attachment for tubing possessed not only of relatively few separate parts, but also so constructed that application of the seal attachment to the tubing is accomplished by a substantially minimum number of successive steps.

Still another object of the invention is to provide a new and improved seal attachment for tubing, the functioning parts of which are of relatively common materials in a structural arrangement which makes the seal attachment one relatively inexpensive, both to manufacture and apply.

Still another object of the invention is to provide a new and improved seal attachment for the ends of fixed relatively rigid tubing which is of such character and operation that the application can be performed by one of no more than modest mechanical ability.

Still further included among the objects of the invention is to provide a new and improved seal attachment for the fixed ends of relatively stiff tubing of a design and construction of which is versatile to the extent of being applicable not only to the circumstance where tubing ends are fixed in position, but also applicable to the interconnection of relatively stiff tube elements wherever a dependable sealing connection may be needed.

The invention, moreover, is one which has among its objects the provision of such a seal attachment, not only having relatively few parts, but with parts so constructed that they tend to hold their position while being applied and in this way enable the user to employ both hands for manipulating the attachment while it is being anchored in position.

With these and other objects in view, the invention consists of the construction, arrangements, and combination of the various parts of the device serving as examples only of one or more embodiments of the invention, whereby the objects contemplated are attained, as hereinafter disclosed in the specification and drawings, and pointed out in the appended claims.

In the drawings:

FIG. 1 is a plan view of the seal attachment in position interconnecting two ends of tubing.

FIG. 2 is a side elevational view on the line 2—2 of FIG. 1.

FIG. 3 is a cross-sectional view on the line 3—3 of FIG. 2.

FIG. 4 is an exploded view of parts of the device of FIG. 1 as occupied when being applied to the tubing.

FIG. 5 is a longitudinal sectional view on the line 5—5 of FIG. 1.

FIG. 6 is fragmentary cross-sectional view on the line 6—6 of FIG. 2.

FIG. 7 is a side elevational view of a second form of the device in assembled condition.

FIG. 8 is a cross-sectional view on the line 8—8 of FIG. 7.

FIG. 9 is a fragmentary cross-sectional view on the line 9—9 of FIG. 7.

FIG. 10 is a side elevational view, similar to FIG. 10, but showing an early stage in application of the parts of the seal to the connection.

FIG. 11 is a side elevational view of the third form of the device shown in operative position.

FIG. 12 is an end elevational view on the line 12—12 of FIG. 11.

FIG. 13 is a fragmentary longitudinal sectional view on the line 13—13 of FIG. 12.

FIG. 14 is an end elevational view similar to FIG. 13 showing an initial position of the parts in attachment of the seal attachment.

FIG. 15 is a longitudinal view, partially broken away, showing still another form of the device.

FIG. 16 is an end elevational view on the line 16—16 of FIG. 15.

FIG. 17 is a cross-sectional view on the line 17—17 of FIG. 15.

In one embodiment of the invention chosen for the purpose of illustration, shown in FIGS. 1 through 6 of the patent drawings, a mechanical seal, indicated generally by the reference character 10, is shown for interconnecting tubes 11 and 12 which occupy fixed positions in that they are shown, by way of example, attached to respective stationary mounts 13 and 14. The tubes 11 and 12 may chance to be of virtually any conventional tube material as, for example, copper, aluminum, steel, or an acceptable type of relatively stiff synthetic plastic resin. The tubes 11 and 12 are shown with adjacent ends 15 and 16 spaced from each other, as shown in FIG. 5, the spacing of which may vary to a degree on different installations.

The mechanical seal 10 comprises substantially opposite complementary half sections. As shown in FIG. 2, a lower section consists of an outer shell 17 of relatively stiff material, sufficient to hold its shape, and an inner semi-cylindrical gasket 18. The upper section is similarly composed of its outer shell 19 and semi-cylindrical gasket 20.

For holding the upper and lower sections in sealing position, as shown in FIGS. 1 and 5, the outer shell 19 is provided with a clamp 21 which is fastened to the outer shell by some conventional attachment such as a screw 22. Arms 23 and 24 at opposite ends of the clamp 21 are provided, respectively, with inwardly bent ends 25 and 26. For cooperation with the inwardly bent ends, the outer shell 17 of the lower section is provided on opposite sides with shoulders 27 and 28.

To further facilitate properly locating the upper and lower sections with respect to the oppositely spaced ends 15 and 16 of the tubes, one or both of the gaskets may be provided with a protuberance 29 midway between opposite ends. The length of the protuberance in each instance is made approximately equal to or less than the space between the opposite ends 15 and 16 of the tubes.

Another incident of effective structure is that the gaskets 18 adjacent end edges 30 are exposed for a short distance between corresponding end edges 31, 31 of the adjacent outer shell 17. The same practice is followed with respect to the end edges 30 of the gasket 20 and corresponding end edges 31, 31 of the outer shell 19.

Still further, as a matter of significant concern, in some forms of the device it is preferable to provide a clamp 21 with some resiliency so that, although having normally a position wherein the inwardly bent ends 25 and 26 would engage beneath the corresponding shoulders 27 and 28, the arms 23 and 24 of the clamp can be moved outwardly so as to pass over the shoulders during assembly. Thereafter they resiliently return, automatically, to positions beneath the shoulders to hold the upper and lower sections in general sealing position without need for the operator to use either hand during final assembly.

It is also of some consequence to have the gasket in each instance fastened in its nested position within the corresponding shell. For this adhesive fastening it is further preferable to have the adhesive applicable only along the center lines of the gasket and shell as, for example, in the instance of the shell 19 centerably at the location of the screw 22. The same centering of the adhesive line is also applicable to the gasket 18 and its shell 17.

When the mechanical seal 10 in the form of invention of FIGS. 1 through 6, inclusive, is ready for application to the tubes 11 and 12, it consists essentially of no more than two parts, namely, the upper section and the lower section. These two sections are then applied over the tubes with the protruberances assisting properly locating the parts of the mechanical seal with respect to the space between the tubes. As the upper and lower sections are applied, opposite ends 23 and 24 of the clamp 21 are allowed to spring outwardly as they engage camming surfaces 32 and 33 of the respective shoulders 27 and 28. In order to clinch the sealing effect, appreciable pressure is applied to opposite outer shells 17 and 19 sufficient to compress the material of the gaskets so that as their end edges 30 are pressed together, the seal is made. During this operation there is a clearance between end edges 31 of the shells to allow the gaskets to compress. During this compressing operation, the inwardly bent ends 25 and 26 slide outwardly to the ends of the shoulders 27 and 28 until they snap over the ends and return to positions beneath the shoulders. In this way the compressed condition of the gaskets is maintained and the seal is completed.

Once clamped, the protuberance 29 assists in preventing the two sections of the seal from shifting longitudinally out of proper sealing position.

It should be noted that the protuberances 29 are at the same time sufficiently shallow so that should they not be contained entirely within the space between opposite ends 15 and 16 of the tubes, the material of the gasket will compress and not impair the seal. The shallow depth of the protuberances is also such that when in position, the protuberances will not impair free flow of fluid between the interiors of the tubes. Should the gaskets be of relative resistant material, an appropriate pressure tool may be employed against opposite outside surfaces of the shells to exercise sufficient force to press the gaskets into sealing relationship. Furthermore, should there be need to disengage the seal, pressure can again be applied sufficient to enable the inwardly bent ends 25 and 26 to be pulled out of engagement and allow the upper and lower sections to be separated from each other and removed from sealing position.

In a second form of the invention shown in FIGS. 7 through 10, inclusive, the mechanical seal makes use of lower and upper shells 17' and 19', respectively, supplied with gaskets 18 and 20 similar to those already described. The shell 17' is provided with pins 40 and 41 on respective opposite sides instead of the shoulders of the first form of the invention. On this occasion a substantially U-shaped clamp 42 is provided with opposite arms 43 and 44 in substantially fixed position. At an end 45 of the arm 43 there is an oblique slot 46 wide enough to engage the pin 40. Similarly an end 47 of the arm 44 is provided with a corresponding oblique slot on the corresponding edge of the arm adapted to engage the pin 41.

For mounting the clamp 42 on the outer shell 19', there is a block 48 which carries a bracket 49 at a location spaced from the adjacent surface of the shell 19'. A handle 50 provided with a shaft 51 is rotatably mounted on the bracket 49 and secured by a conventional snap ring 52. Threads 53 on the shaft 51 threadably engage a tapped opening 54 at the upper center of the clamp 42.

When the above described second form of the invention is to be applied to tubes 11 and 12, the handle 50 is rotated so as to withdraw the clamp 42 substantially away from engagement with the corresponding shell. The lower section of the mechanical seal carried by the shell 17 is then applied to one side of the tubes in centered position with respect to the space between them. The other section carried by the shell 19' is then applied to the opposite sides of the tubes but displaced a short distance axially from the location of the shell 17'. The shell 19' is then slid axially or endwise with respect to the shell 17' until the pins 40 and 41 are pushed into the corresponding oblique slots 46. Once in place, the handle 50 is rotated in a direction causing the end of the shaft 51 to be pressed into engagement with the surface of the shell. As the shaft continues to be rotated, the clamp 42 is drawn upwardly, as viewed in FIGS. 7, through 10, in this way to draw the shells and their corresponding gaskets into engagement with each other and in this way to seal the mechanical seal in position on the tubes.

The pins 40, 41 may be so located with respect to the corresponding slots 46 that the clamp 42 can be slid substantially into final alignment before the clamp 42 is tightened.

On those occasions when a more rugged mechanical seal might be desired, the form of invention of FIGS. 11 through 14 may be employed. On this occasion posts 60 and 61 are anchored at the uppermost mid-portion of the shell 19″. There is a bar 62 spanning the posts and with corresponding apertures 63 and 64 through which the posts pass. Each post is provided with a head 65. On this occasion a clamp 66 extends through and is carried by the bar 62. As in the first described form of the invention, inwardly bent ends 25′ and 26′ engage corresponding shoulders 27′, 28′ of the shell 17.

As shown in FIG. 14, when the upper and lower sections are initially applied, the inwardly bent ends 25′, 26′ may be positioned clear of the corresponding shoulders. By having a handle 67 provided with a threaded shaft 68 which extends through and in threaded engagement with the bar 62, the handle can then be rotated to pull the clamp 66 upwardly and the inwardly bent ends at the same time into engagement with the shoulders. Continued rotation of the handle ultimately pulls the gaskets into sealing engagement with the tubes 11 and 12 and with their end edges 30 into engagement with each other. By reverse rotation of the handle, this form of the mechanical seal can be readily disengaged from sealing relationship with the tubes.

A shell assembly 75 for use in all of the first described forms of the invention is shown in FIGS. 15, 16 and 17. For this assembly there is an outer shell 76 within which an inner shell 77 is adapted to nest. The outer shell is provided with a gasket 78 and the inner shell with its gasket 79. The gaskets are of the same type as those heretofore described and are equipped and adapted to fit around the tubes 11 and 12 in the same manner. The shell assembly 75, however, is provided with closed ends. For the outer shell 76 each end has an end wall 80 in which there is a diametrically extending slot 81. The slot 81 is wide enough to comfortably accommodate the outer diameter of one or another of the tubes 11 and 12. Walls 82 and 83 of the slot 81 comfortably clear the tubes when the shell is applied.

For ease in assembly of the mechanical seal of FIG. 16, there is a button 84 on the wall 82 and a button 85 on the wall 83. Spacing between the buttons 84 and 85 is slightly less than the outside diameter of the tube. The material of the end wall 80 is, however, sufficiently flexible so that when the shell is applied to the tube, the end wall will yield sufficient to be snapped into position on the tube where it will remain until the opposite parts of the mechanical seal are drawn together into sealing relationship. The buttons are made reference to by way of example. Other means may be provided with comparable effect. One such means is an arcuate flat spring in the slot 81 provided with bulges at the location of the buttons.

The inner shell 77 is also provided at each end with an end wall 86. The end wall 86 is also provided with a relatively shallow, arcuate slot 87 which fits over a portion of the exterior of the tube in each case. The distance between end walls 86 at opposite ends of the inner shell 77 is, however, slightly less than the distance between inside surfaces of the end walls 80 of the outer shell 76 so that the end walls 86 can nest within the end walls 80. Constructed in this fashion, when the outer shell is snapped into position on the tubes and the inner shell is then pushed into nested relationship within the outer shell, the two shells will retain their assembled positions until the shells and their corresponding gaskets are pressed together by the clamping means which chances to be chosen to be employed with them.

While particular embodiments of the present invention have been shown and described, it will be obvious to those skilled in the art that changes and modifications may be made without departing from the invention in its broader aspects and, therefore, the aims of its appended claims are to cover all such changes and modifications as fall within the true spirit and scope of this invention.

Having described the invention, what is claimed as new in support of Letters Patent is:

1. A mechanical seal for use on stiff-walled tubing comprising complementary semicylindrical shells of uniform wall thickness, a complementary semicylindrical sealing gasket of inherently resilient character mounted in each shell, each sealing gasket having a semicylindrical recess on an initially exposed side for sealing reception of the exterior of the tubing, complementary longitudinal edges of said gaskets having at exposed locations beyond corresponding edges of said shells for mutually sealing engagement, attachment means for the complementary shells comprising a clamp on one of the shells having an arm with single laterally extending opposite sides and ends and at a location substantially midway between opposite ends of the shells, clamp accepting protrusions on the other shell for engagement by said opposite ends, and pressure means acting between said clamp and said protrusions whereby to hold the complementary longitudinal edges of said gaskets in sealing engagement with said tubing and with each other, means at free ends of said clamp extending substantially transversely with respect to the long axis of the clamp whereby to enable engagement of the clamp with the protrusion by movement of the corresponding shell axially relative to the axis of the tubing, the shell on which the clamp is mounted having a bracket supporting the clamp at a location spaced from the shell, a handle on said bracket and a shaft on the handle in engagement with the shell movable in a direction for application of pressure on said clamp whereby to move the shells and gaskets into positions of sealing engagement with the tubing, the handle being rotatably mounted on the bracket and said shaft being a screw threaded shaft in threaded engagement with the clamp.

* * * * *